Figure 1:
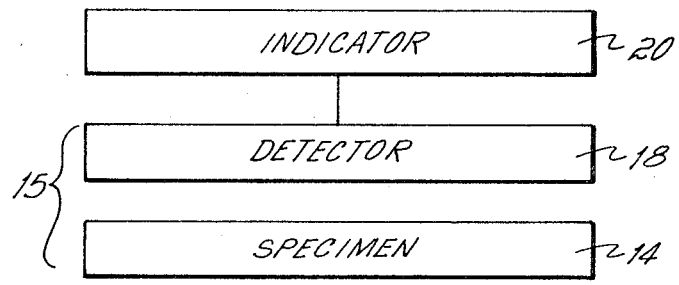
Figure 1:
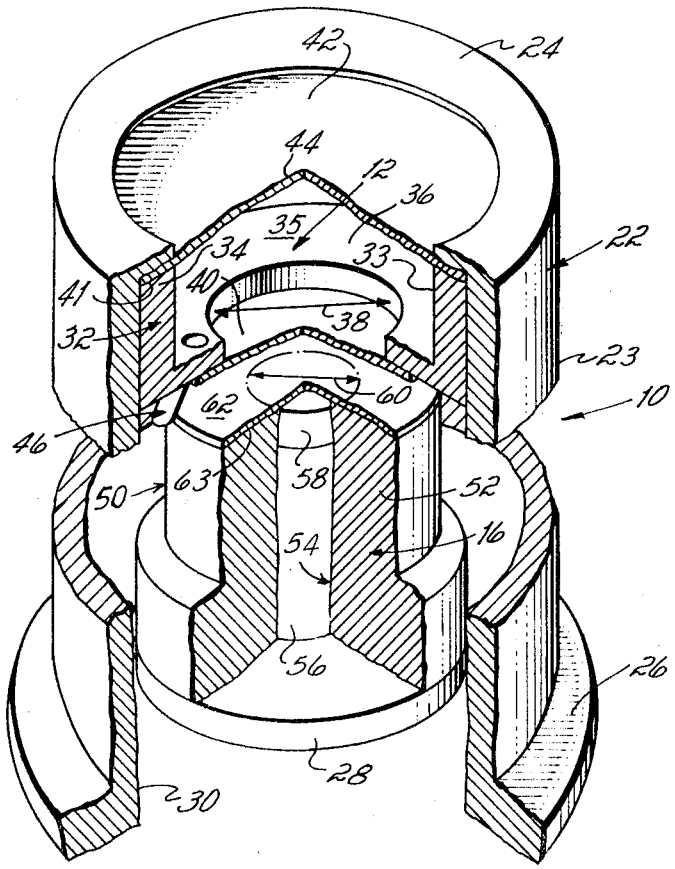

United States Patent
Cahill et al.

[15] 3,665,199
[45] May 23, 1972

[54] BETA-RAY THICKNESS GAUGE USING A TWO ENERGY LEVEL BETA-RAY SOURCE

[72] Inventors: Bonaventure B. Cahill, Ft. Mitchell, Ky.; Wilfred W. Lyon, Cincinnati, Ohio

[73] Assignee: The Ohmart Corporation, Cincinnati, Ohio

[22] Filed: Nov. 10, 1969

[21] Appl. No.: 875,200

[52] U.S. Cl. ..................................250/106 S, 250/83.3 D
[51] Int. Cl. .........................................................G21h 5/00
[58] Field of Search.................................250/83.3 D, 106 S

[56] References Cited

UNITED STATES PATENTS

| | | | |
|---|---|---|---|
| 2,700,111 | 1/1955 | Jacobs et al. | 250/106 S |
| 2,830,190 | 4/1958 | Karp | 250/106 S |
| 2,884,535 | 4/1959 | Swift, Jr. | 250/106 S X |
| 2,884,538 | 4/1959 | Swift, Jr. | 250/106 S X |

*Primary Examiner*—Archie R. Borchelt
*Attorney*—Wood, Herron & Evans

[57] ABSTRACT

A beta gauge for measuring the thickness of material over an extended range, for example, 0 – 750 mg/cm$^2$, including a first cell containing gaseous low energy beta-emitting radioactive Krypton-85 and having a first window adjacent an air gap in which the specimen to be measured is located and a second window opposite thereto, and a second cell containing high energy beta-emitting radioactive Strontium-90/Yttrium-90 located adjacent the Krypton cell on the side thereof opposite the air gap and having a third window aligned with the first and second windows of the Krypton cell through which beta radiation from the Strontium-90/Yttrium-90 passes along a path to the specimen which includes also the first and second windows of the Krypton cell as well as the Krypton itself.

10 Claims, 2 Drawing Figures

Patented May 23, 1972  3,665,199

2 Sheets-Sheet 1

INVENTORS
Bonaventure B. Cahill
BY Wilfred W. Lyon
Wood, Herron & Evans
ATTORNEYS

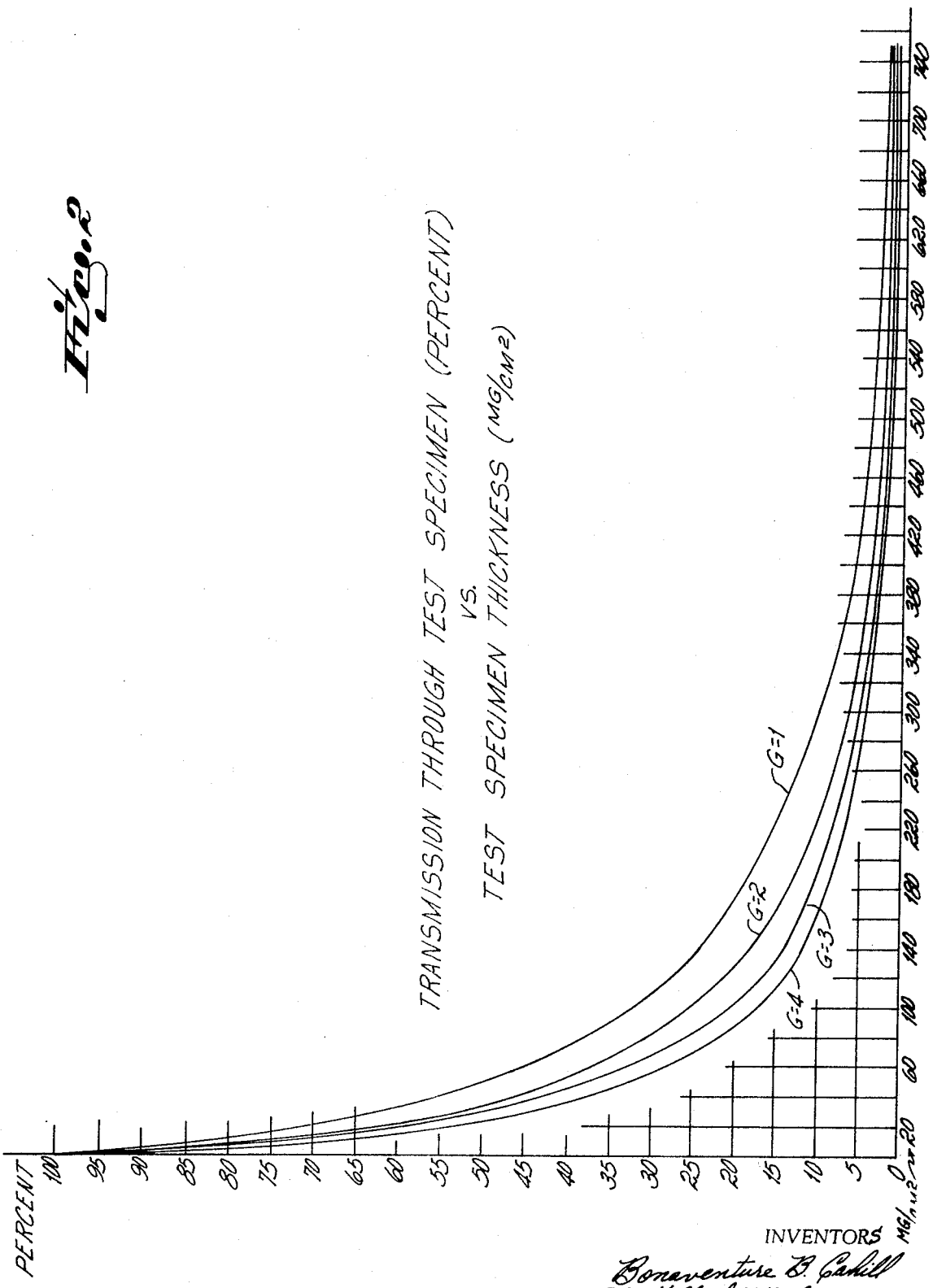

BETA-RAY THICKNESS GAUGE USING A TWO ENERGY LEVEL BETA-RAY SOURCE

This invention relates to nuclear gauges and more particularly to a nuclear gauge capable of measuring thickness over an extended range and a source of beta radiation therefor.

In many nuclear thickness gauging applications, particularly beta gauging applications, the requirements of the gauging application vary significantly from day to day or week to week by virtue of the change in thickness and/or composition of the materials being gauged. For example in a sheet or film manufacturing application where the sheet or film fabricating equipment is designed to manufacture film of different thicknesses and compositions depending upon the particular manufacturing requirements at the time, the demands on the thickness gauge vary depending upon the composition and/or thickness of the particular material being manufactured. Illustrative of such variation is a polyethylene terephthalate film manufacturing installation where the thickness of the film being manufactured may vary anywhere between slightly more than 0 to 750 mg/cm$^2$ depending upon whether thin sheets, medium thickness sheets or thick sheets are being manufactured at the particular time. A gauge utilized in conjunction with a polyethylene terephthalate sheet manufacturing process, therefore, to be a maximum utility, must be capable of measuring the thickness of such films over the extended range of 0 to 750 mg/cm$^2$.

Accordingly, it has been an objective of this invention to provide a nuclear thickness measuring gauge useful in measuring the thickness of films over the extended range of 0 to 750 mg/cm$^2$. This objective has been accomplished in accordance with the principles of this invention by providing, in combination with a radiation detector, a very novel and unobvious dual energy beta source. The source includes a first beta-emitting radioactive material providing relatively low energy beta radiation ideally suited for measuring film thicknesses in a low thickness portion of the range, a second radioactive beta-emitting material having beta energy emission characteristics which differ from the first material and which provides a relatively high energy beta radiation useful in measuring film thicknesses in the remaining high thickness portion of the extended thickness range, and container means for the radioactive materials which are constructed in a manner which permits both beta-emitting radioactive materials to simultaneously irradiate the specimen which is being measured. In accordance with a preferred embodiment the relatively low energy beta-emitting first radioactive material is Krypton-85 while the relatively high energy beta-emitting second radioactive material is Strontium-90/Yttrium-90.

The beta gauge of this invention permits films, whose thicknesses vary over an extended range, to be measured using a single gauge, and without need for changing, altering, or otherwise modifying the radiation source utilized in the gauge. Additionally, by varying the millicurie ratio of the high and low energy beta-emitting radioactive materials, it is possible to alter the sensitivity of the gauge in selected portions of the extended thickness range, thereby tailoring the gauge to the specific requirement of a given gauging application.

It has also been an objective of this invention to provide a dual source for an extended thickness range gauge which provides a homogenous, uniformly mixed radiation beam for irradiating the specimen under test, and a beam which does not undergo unnecessary attenuation in its path to the specimen. This objective has been accomplished in accordance with certain further principles of this invention by providing a first container or cell having a first window adjacent the air gap in which the specimen is located and a second window disposed in a wall of the container opposite thereto, and a second cell or container located adjacent that side of the first cell which is opposite the air gap and having a third window adjacent and in alignment with the second window of the first cell, with the first cell containing a radioactive material having a very low mass per unit area, such as gaseous Krypton-85, and the other cell containing the other radioactive material. With such a dual source structure, wherein a low mass per unit area radioactive material is in the container closest to the air gap, the radiation emitted by the second radioactive material located in the more distant second container is not unnecessarily attenuated as it passes through the first container in its path to the test specimen. Additionally, since the windows of the containers are all aligned, the radiations from the respective radioactive materials irradiate the test specimen along a common path, providing a homogenous, or uniform, mixture of radiation from the differently positioned radioactive materials.

These and other advantages and objectives of the invention will become more readily apparent from a detailed description of the invention taken in conjunction with the drawings in which:

FIG. 1 is a perspective view, partially cut away and exploded, showing beta gauge having a dual energy beta-emitting source, and FIG. 2 is a plot of the radiation transmitted through a test specimen, in percent, versus the thickness of the test specimen, in milligrams per square centimeter, for a dual energy beta gauge having varying millicurie ratios for the different energy-emitting radioactive materials.

A preferred embodiment of a nuclear gauge constructed in accordance with the principles of this invention is depicted in FIG. 1. As shown in FIG. 1, the gauge includes a dual energy beta source 10 which irradiates a specimen 14, a characteristic such as the thickness of which is to be measured over an extended thickness range, located in an air gap 15 defined by the source 10 and a radiation detector 18. The dual energy beta source includes a first or upper beta radiation emitting source 12 which irradiates the specimen 14, and a second beta radiation emitting source 16 which also irradiates the specimen 14. The maximum energy levels of the beta radiation emitted by the sources 12 and 16 are different. The upper source 12 provides relatively low energy radiation which is useful in measuring the characteristic, for example, the thickness of the specimen over a first or low thickness portion of an extended thickness range, while the radiation emitted by the second source 16 is relatively high in energy being useful in measuring the thickness of the specimen over the remaining, higher thickness portion of the extended thickness range. The radiation detector 18 is responsive to unattenuated beta radiation from both the source 12 and the source 16 transmitted by the specimen 14. The output of the detector 18 is input to a utilization device 20, such as an indicating instrument appropriately calibrated to register the characteristic, such as specimen thickness, being measured.

The dual energy beta source 10, considered in more detail, includes a support, frame, or housing 22 which is generally cylindrical in form having a central section 23 provided with a bore 30 which is located between an upper horizontal, radially inwardly extending lip or margin 24 and a similar lower horizontal, but radially outwardly extending, rim or lip 26. The housing 22, in a preferred form is fabricated of stainless steel, type 304, and has an overall height of approximately 1⅛ inches, a diameter excluding the lower lip 26 of approximately 1¼ inches, and a wall thickness of approximately one-eighth inch. The housing 22 also includes a circular disc 28 which, when the source 10 is fully assembled, seals the bottom of the bore 30 formed in the housing 22. The sealing disc 28, in a preferred form is fabricated of stainless steel of the same type and thickness as the remainder of the housing 22. The sealing disc 28 can be held in place to seal the lower end of the bore 30 by conventional techniques, such as by welding the disc to the tubular section 23.

The first or upper source 12 includes a container or cell 32 having a vertical tubular section 34, and an integral lower annular inwardly extending lip 36 defining a central opening 38 which is sealed by a sheet of metallic foil 40. The upper edge 41 of the tubular section 34 of the container 32 defines a second opening 42 which, like the opening 38, is also sealed by a sheet of metallic foil 44. The tubular container section 34 and integral lip 36 are preferably fabricated of stainless steel of the type utilized in the housing 22, with a thickness of approximately three-sixteenths inch. The foil sheets 40 and 44 which seal the openings 38 and 42 are preferably fabricated of stainless steel, for example, type 304, 316, or 317, having a thickness of 2 mils. The foil sheets 40 and 44 are preferably secured to the lip 36 and edge 41 of the container tubular section 34 by conventional gold brazing techniques.

The openings 38 and 42 and their respectively associated sealing foils 40 and 44 constitute lower and upper windows of the container 32, respectively. For reasons which will become apparent hereafter the upper window 44 must be transparent to both the low energy beta radiation emitted by the upper source 12 as well as the relatively high energy beta radiation emitted by the lower source 16, while the lower window 38, 40 must be transparent to the relatively high energy beta radiation emitted by the lower source 16. The lower window 38, 40 may, if desired, be transparent to the relatively low energy beta radiation emitted by the upper source 12. In a preferred embodiment the diameter of the opening 42, which defines the size of the upper window 42, 44 is approximately fifteen-sixteenths inch, while the diameter of the opening 38 which defines the size of the lower window 38, 40 is approximately one-half inch.

The interior of the container 32 defined by a bore 33, foils 40 and 44, and the lip 36 constitutes a cavity 35 which is filled with relatively low energy beta-emitting radioactive material. It is essential that the mass per unit area of the radioactive material in the cavity 35 be low in order that radiation from the lower source 16 is not unduly attenuated in its path through the upper source 12 to the specimen 14. Preferably the low energy beta radiation emitting radioactive material in the cavity 35 is gaseous state Krypton-85, a radioactive isotope which emits beta radiation having a maximum energy of 0.54 MEV. To facilitate filling the cavity 35 with the preferred radioactive material, a suitable gas conduit means 46 is provided in the rim 36. The conduit means 46 at its upper end communicates with the cavity 35 of the cell 32 and at its lower end is connectable to a suitable source of gaseous Krypton-85 (not shown). Since, in the preferred embodiment, the radioactive material in cavity 35 is in a gaseous state, the cavity 35 must be gas-tight in construction.

The lower source 16 includes a container or cell 50 having a tubular section 52 provided with a central axial bore 54. The lower and major portion of the bore 54 is sealed by a cylindrical plug 56 which snugly interfits in the bore 54 and has its lower edge welded to the lower edge of the bore 54. The upper portion of the bore 54 not occupied by the plug 56 constitutes a cavity 58 terminating in an opening 60 which is sealed by a thin sheet of metallic foil of the same composition and thickness as the foils 40 and 42. The opening 60 and foil 62 constitute a window for the container 50 through which high energy beta radiation from the source 16 passes in the course of irradiating the specimen 14. The foil 62, in practice, is in contact with the foil 40, thereby eliminating an unnecessary air gap between the foils 40 and 62. The diameter of the opening 60 which defines the size of the window 60, 62 is, in a preferred form, approximately one-quarter inch. The foil 62, like the foils 40 and 42, is secured to the upper edge 63 of its respective container structure 52 by conventional gold brazing techniques.

The cavity 58 of the container 50 contains relatively high energy beta radiation emitting radioactive material. Preferably the radioactive material in the cavity 58 is Strontium-90/Yttrium-90 in the form of solid state microspheres. Strontium-90/Yttrium-90 in this form is available from Minnesota Mining and Manufacturing Company, designated source material 3F1E. In a Strontium-90/Yttrium-90 source, the Strontium-90 decays, yielding beta radiation having a maximum energy of 0.54 MEV and unstable Yttrium-90. The Yttrium-90 in turn decays, yielding beta radiation having a maximum energy of 2.24 MEV and stable Zirconium-90. It is the 2.24 MEV radiation of the Strontium-90/ /Yttrium-90 source that comprises the relatively high energy beta radiation of the Strontium-90/Yttrium-90 source. The window 60, 62 must be transparent to the beta radiation emitted by the source 16.

In operation, the relatively high energy beta radiation emitted by the Strontium-90/Yttrium-90 in cavity 58 of container 50 of the lower source 16 irradiates the specimen 14 following a path which includes the window 60, 62 of the container 50, the lower window 38, 40 and the upper window 42, 44 of the container 32, as well as the mass of Krypton-85 gas in the cavity 35 of the container 32 of upper source 12.

Since the radioactive material in the cavity 35 of the upper source container 32 is in the form of a gas, it has a relatively low mass per unit area. Hence, the beta radiation from the lower source 16 is not unduly attenuated as it passes through the upper cell 12 in its path to the specimen 14.

The relatively low energy beta radiation emitted by the radioactive Krypton-85 in the cavity 35 of the upper cell container 32 passes through the upper window 42, 44 also irradiating the specimen 14. Since the radiation from the Krypton-85 in the upper source 12 and the radiation from the Strontium-90/Yttrium-90 in the lower source 16 follow a common path in the course of irradiating the specimen 14, the incident radiation on the specimen is a homogenous, or uniform, mixture of the relatively low and high energy beta radiations emitted by the upper and lower sources 12 and 16. Thus, that portion of the specimen 14 which is irradiated by the sources 12 and 16 is subjected to a uniform and homogenous mixture of both high and low energy beta radiations. This is to be contrasted with the composite radiation beam obtained by placing two different energy radiation sources in side-by-side, or juxtaposed, position. In this latter case, the resultant beam would not be a uniform or homogenous mixture of different energy radiations, but would rather constitute two separate, albeit adjacent, beams of differing energy.

In a preferred form of dual energy source 10, cavities 35 and 58 of the upper and lower sources 12 and 16 contain 1,200 millicuries of Krypton-85 and 100 millicuries of Strontium-90/Yttrium-90, respectively. With 100 and 1,200 millicuries of Strontium-90/Yttrium-90 and Krypton-85 provided, the ratio, $G$, of the output of the detector 18 contributed by Krypton-85 versus the detector output contributed by Strontium-90/Yttrium-90 is $G=1$. Where $G=1$, an extended thickness range gauge of the type shown in FIG. 1 is provided having the transmission curve labeled $G=1$ depicted in FIG. 2. If desired, the millicurie ratio of the respective radioactive materials, Krypton-85 and Strontium-90/Yttrium-90, may be varied to provide $G$ values other than $G=1$, thereby varying the sensitivity of the gauge of FIG. 1 in selected portions of the extended thickness range. For example, by increasing the value of $G$ to values of $G=2$, $G=3$, or $G=4$, the sensitivity of the gauge of FIG. 1 in the low thickness range is successively increased as shown by the initially steeper slope of respective transmission curves of FIG. 2 labeled $G=2$, $G=3$, and $G=4$. A gauge useful in measuring the thickness of material over an extended thickness range has been provided, namely, in the range of 0 – 750 mg/cm$^2$. Also, an extended thickness range gauge has been provided in which the sensitivity of the gauge in selected portions of the range can be varied by a very simple expedient, namely, by varying the millicurie ratio of the low and high energy beta-emitting radioactive materials. Further, a source useful in the extended range gauge of this invention has been provided which affords a homogenous, or uniform, mixture of relatively low and relatively high energy beta radiations derived from physically separate and distinct radioactive materials, and which provide such uniform and homogenous beams without undue attenuation of the radiation from either of the radioactive materials.

The useful range of the thickness measuring gauge can be extended beyond 750 mg/cm$^2$ by substituting a higher energy radioactive material for the Strontium-90/Yttrium-90. For example, the range can be further extended by substituting a gamma emitting radioactive material such as Americium-241, Cesium-137, or the like. A suitable Bremsstrahlung source could also be used as a substitute.

What is claimed is:

1. A radiation source useful in measuring the thickness of film specimens having thicknesses in the range 0 – 750 mg/cm$^2$, said source comprising:
   a support,
   a first container stationarily mounted to said support at a first physical position,
   a second container stationarily mounted to said support at a second physical position different from said first position, thereby rendering said containers fixed relative to each other at different physical positions,
   a relatively low energy beta-emitting first radioactive material useful in measuring film thicknesses in one portion of said range, said first material being located in said first container,
   a relatively high energy beta-emitting second radioactive material useful in measuring film thickness in the remaining portion of said range, said second material being located in said second container, and having different beta energy emission characteristics than said first material,
   said first and second containers including means for causing both said first and second materials to simultaneously irradiate along a common aligned path the same film specimen, the thickness of which is being measured, with a homogenous mixture of radiation from both said first and second differently positioned materials.

2. A radiation source for irradiating a specimen with a homogenous beam of different energy radiation emitted by different energy-emitting materials, comprising:
   a first container having a first window located proximate the specimen to be measured and a second window located opposite said first window,
   a second container stationarily mounted relative to said first container and having a third window aligned with said second window,
   an energy-emitting first radioactive material located in said second container for irradiating said specimen to be measured along a path including said first, second, and third windows, and
   an energy-emitting second radioactive material located in said first container for irradiating said specimen through said first window simultaneously with the irradiating of said specimen by said first material, said second material having different energy emission characteristics than said first material, said second material also having a relatively low mass per unit area to thereby prevent undue attenuation of radiation from said first material as it passes to said specimen along said path including said second window and said first window.

3. The source of claim 2 wherein said second material is in a gaseous state and said first container is gas-tight.

4. The source of claim 3 wherein said first material is in a solid state.

5. The source of claim 2 wherein said second material is gaseous state Krypton-85, and said first material is solid state Strontium-90.

6. A method of measuring the thickness of film specimens having thicknesses varying over the range of 0 – 750 mg/cm$^2$, comprising the steps of:
   simultaneously irradiating along a common aligned path the specimen being measured with a homogenous mixture of (a) relatively low energy beta radiation emitted by a first beta-emitting radioactive material useful in measuring thicknesses in one portion of said range and located at a first position, and (b) relatively high energy beta radiation emitted by a second beta-emitting radioactive material useful in measuring thicknesses in the remainder of said range and located at a second position different from said first position, said materials having different beta energy emission characteristics, and
   detecting said homogenous mixture of radiation after it has interacted with said specimen with a detector responsive to a homogenous mixture of radiation from both said first and second differently positioned radioactive materials.

7. The method of claim 6 wherein said irradiating step includes simultaneously irradiating said specimen with a homogenous beam of beta radiation from Krypton-85 and Strontium-90.

8. A sensitivity-variable method of measuring the thickness of film specimens having thicknesses varying over the range of 0 – 750 mg/cm$^2$, comprising the steps of:
   simultaneously irradiating along a common aligned path the specimen being measured with a homogenous mixture of (a) relatively low energy beta radiation emitted by a first beta-emitting radioactive material located at a first point in space and useful in measuring thicknesses in one portion of said range and (b) relatively high energy beta radiation emitted by a second beta-emitting radioactive material located at a second point in space different from said first point and useful in measuring thicknesses in the remainder of said range, said materials having different beta energy emission characteristics,
   altering the millicurie ratio of said first and second beta-emitting materials to thereby vary the sensitivity of said measuring method, and
   detecting said homogenous mixture of radiation after it has interacted with said specimen with a detector responsive to a homogenous mixture of radiation from both said first and second differently positioned radioactive materials.

9. A radiation source useful in measuring the thickness of film specimens over an extended thickness range, said source comprising:
   a support,
   a first container stationarily mounted to said support at a first physical position,
   a second container stationarily mounted to said support at a second physical position different from said first position, thereby rendering said containers fixed relative to each other at different positions,
   a relatively low energy emitting first radioactive material useful in measuring film thicknesses in a relatively low thickness portion of said range, said first material being located in said first container,
   a relatively high energy emitting second radioactive material useful in measuring film thickness in the remaining portion of said range, said second material being located in said second container and having different energy emission characteristics than said first material,
   said first and second containers including means for causing both said first and second materials to simultaneously irradiate along a common aligned path the same portion of a film specimen, the thickness of which is being measured, with a homogenous mixture of radiation from both said first and second differently positioned materials.

10. A composite radiation source for irradiating a specimen with a homogenous mixture of different energy radiation emitted by first and second radiation sources, said composite source comprising:
   structure defining a first container, said first container structure being permeable to radiation at a first point proximate the specimen to be measured and at a second point different from said first point,
   structure defining a second container, said second container structure being permeable to radiation at a third point and mounted relative to said first container to provide alignment of said third point and said second point,
   a first radiation source located within said second container structure for irradiating said specimen along a path including said first, second, and third points,
   a second radiation source located within said first container for irradiating said specimen along a path including said first point simultaneously with the irradiation of said specimen by said first source, said radiation emitted from said second container at said third point being different than the radiation emitted from said second source, said second source having a relatively low mass per unit area to thereby prevent undue attenuation of radiation emitted from said second container as it passes to said specimen along a path including said first and second points.

* * * * *